Jan. 9, 1945.  W. LAUPER  2,366,912
SPEED CHANGE GEAR
Filed Sept. 24, 1942  2 Sheets-Sheet 1

Inventor
W. Lauper

Patented Jan. 9, 1945

2,366,912

UNITED STATES PATENT OFFICE 2,366,912

SPEED CHANGE GEAR

Werner Lauper, Bienne, Switzerland, assignor to Nouvelle Zesar S. A., Nidau, near Bienne, Switzerland, a joint-stock company of Switzerland Application September 24, 1942, Serial No. 459,569
In Switzerland April 23, 1941

1 Claim. (Cl. 74—577)

The object of the present invention is a speed change gear specially but not exclusively for bicycles, in which the speed change is obtained by rotating the driving shaft backwards and in which the transmission gear wheels connected with the driven member on the driven shaft are controlled by pairs of spring-controlled pawls on the driving shaft.

This invention relates to improvements of this type of speed change gears. The springs operating the above-mentioned pawls had hitherto the disadvantage that they jammed in the recesses of the driving shaft in which they were supported and that often a side buckling of the part lying outside these recesses occurred. This resulted in annoying disturbances.

After many tests a spring construction has been found by which both the above-mentioned side buckling and the jamming are avoided. This construction is characterised in that the springs acting upon the pawls are supported on these latter by means of joints.

In a preferred embodiment the springs are tapered towards their supporting means on the pawls.

The accompanying drawings illustrate, by way of example, one embodiment of the object of the invention.

Figure 5:
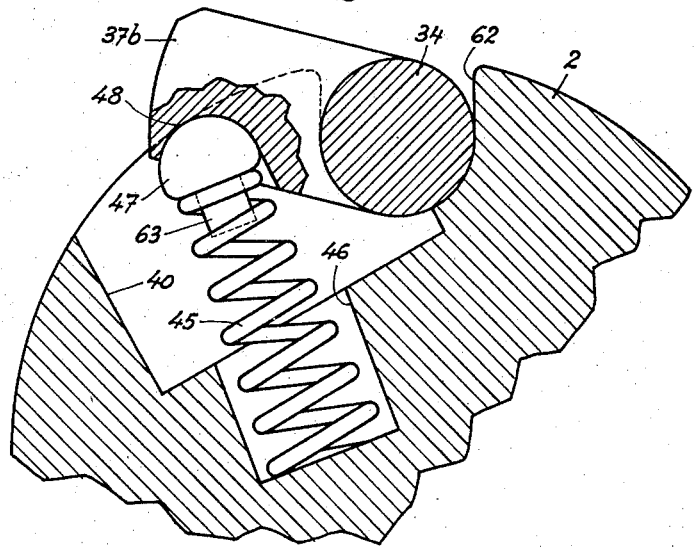

Fig. 5 the same but with released spring.

The illustrated speed change gear has three speed stages and is such an embodiment of the gear type mentioned above, in which each pair of pawls consists of two pawls adapted to be lowered into the driving shaft and mounted on a bolt arranged in a longitudinal groove of this shaft, one of these pawls cooperating with a change speed wheel rotatably mounted on the driving shaft, while the other pawl is in operating relation with a changing disc which, on rotating the driving shaft backwards, brings the pawls cooperating with the change speed wheels one after the other in and out of engagement with these latter, the whole being such that the gear can be changed from each speed stage to any other stage by a single back movement and a subsequent forward movement of the driving shaft.

In the following statement the gear is only described in so far as is necessary for the comprehension of the general arrangement and of the invention.

The tread cranks 1 are fixed to the tread crankshaft 2. On the latter the gear wheels 3, 4, 5 are loosely arranged and are in permanent engagement with the toothed rims 6, 7, 8 of the wheel 9. The latter is mounted by means of the roller bearings 10 on the counteraxle 11 which, on its part, is supported in bushings 12, 13 of the casing and is locked against rotation by means of the pin 15. The hub 16 of the gear wheel 5 to which, besides the chain wheel 17 of the bicycle is fixed is pivotally mounted on the casing 14 by means of the roller bearing 18. The crankshaft 2 is likewise supported on roller bearings and that, at the one end, on the hub 16 by means of the roller bearings 22 and, at the other end, by a roller bearing 23 on the adjusting dish 24.

Figure 4:
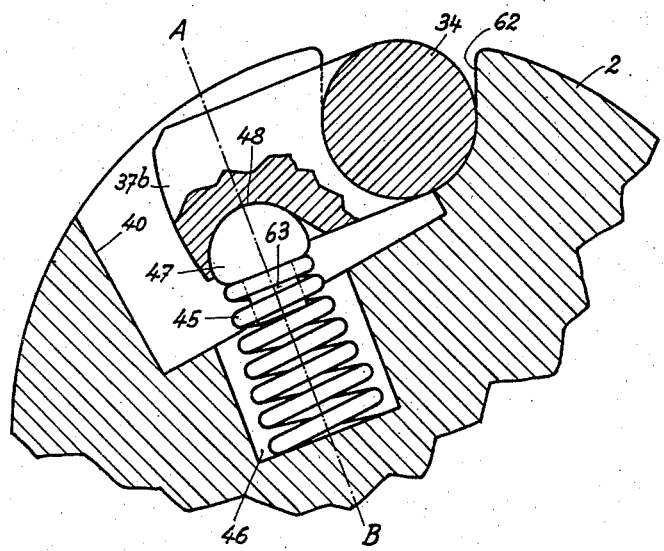
Fig. 4 shows a pawl with a spring in compressed state.

In the longitudinal grooves 62 of the crankshaft 2 lie the axles 34, 35, 36 which are fixed in a known manner to the shaft 2 or to parts fastened to the same. Each of these axles carries two pawls 37a and 37b, 38a, 38b, 39a, 39b. All the b-pawls lie in a plane perpendicular to the crankshaft 2, while the pawl 37a is within reach of the wheel 3, the pawl 38a within reach of the wheel 4 and the pawl 39a within reach of the wheel 5. The crankshaft 2 has recesses 40 into which the pawls can enter. The a-pawls can be alternately brought in and out of engagement with the gear wheels 3, 4 and 5 in order to render different gear ratios between the crank shaft 2 and the chain wheel 17 possible with these wheels 3, 4, 5 and the toothed rims 6, 7 and 8. Therefore, the wheels 3 and 4 and the sleeve 44 which takes the wheel 5 along, have cut-outs 41, 42 and 43 which can be engaged by the pawls 37a, 38a and 39a to take the wheels 3, 4 and 5 along. Springs 45 act upon the b-pawls, which tend to throw these b-pawls out of the recesses 40. They rest in cut-outs, e. g., bores 46 of the crankshaft 2 and are tapered, e. g., conically tapered towards the pawls. At the tapered end of each spring 45 a joint head 47 rests, e. g., of spherical form which is placed upon the spring 45 by means of the pin 63 and cooperates with a corresponding joint cup 48 of the b-pawls. The tapering of the springs 45 and their pivotal support by means of the head 47 and cup 48 prevents a side buckling of the spring and a jamming of the same in the bores 46; both in the released state (Fig. 5) and in the compressed state (Fig. 4), the spring axis remains at least approximately in the line A—B.

A change disc 49 is arranged on the crankshaft 2 within reach of the b-pawls, this change disc having a curved cut-out 50. The latter, at one end, runs gradually into the bore of the disc 49 and, at the other end, forms a supporting surface 51. The cut-out 50, when lying opposite of a b-pawl, allows the latter to be thrown out. The change disc 49 has two toothed rims 49a and 49b lying in two different planes and having counter-pointed teeth.

On the axle 11 a back disc 52 is provided which carries a spring-loaded pawl 53 and which can be turned until it strikes against the stops 54. The back disc has a tooth 55 intended to cooperate with the teeth 49b of the change disc 49. Besides this, the back disc 52 has a curved profile 56 cooperating with a spring-loaded lever 57. The back disc 52, together with the change disc 49, serves the purpose of controlling the changing of the speed change gear.

The change speed gear is operated as follows:

We will suppose that the carrier pawl corresponding to gear wheel 4 be effective, that is that dog 38a be engaged with one of the notches 42 in the gear wheel 4. Then dog 38b and disk 49 take the relative position shown in Fig. 2, and also the parts 52 and 53. It is desired to change the gear ratio into the following step.

Figure 1:
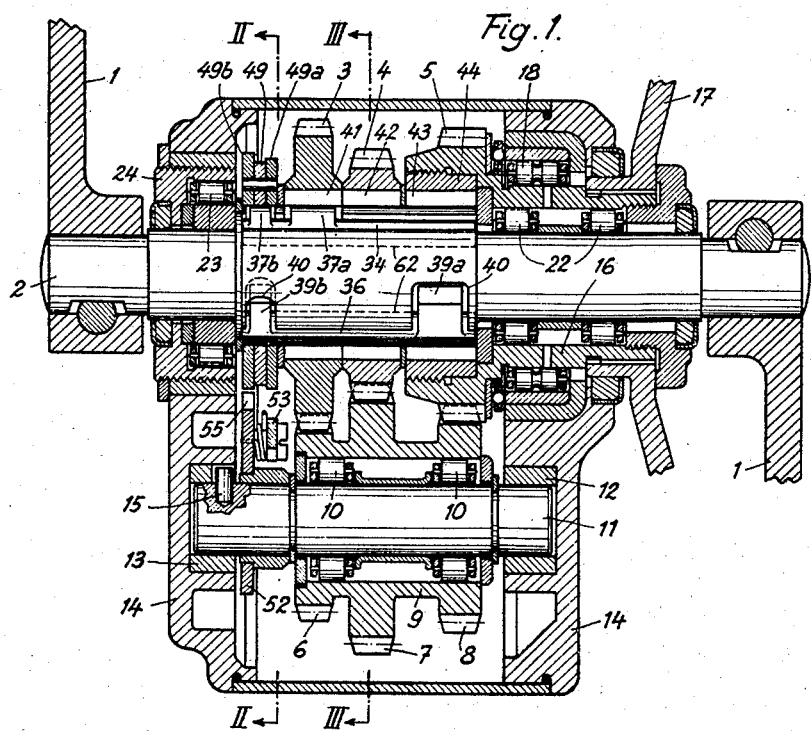
Fig. 1 is an axial section through the gear.
Figure 2:
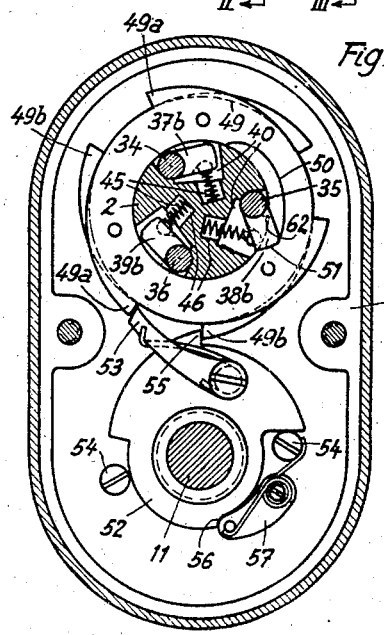
Fig. 2 is a section along the line II—II in Fig. 1.
Figure 3:
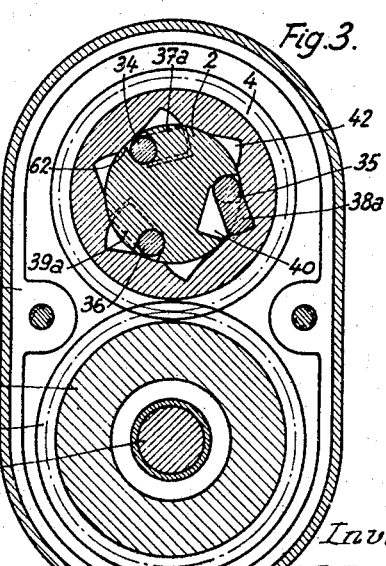
Fig. 3 is a section along the line III—III of Fig. 1.

For this purpose the crankshaft must be back-pedaled for a quarter turn in an anti-clockwise direction (Fig. 2). Then control disk 49 taken along by friction will contact by tooth 49a with pawl 53 and turn the stop plate 52 into the position of Fig. 2. The control disk is thereby stopped, but the shaft 2 continues turning. Therefore, the dog 38b projecting into the cut out 50 will leave this recess and be pressed back into its recess 40 together with the corresponding dog 38a which is also sunk into its recess 40 of the crankshaft and is disengaged therefore from the gear wheel 4. Now by the continued back-pedaling, dog 39b will take the place of dog 38b and come to face the recess 50 and will be expelled by its spring 45 from its recess 40 in the crankshaft when the cooperating dog 39a can drop into a recess 43 of the gear wheel 5. If this dog does not face said recess, dog 39b remains within its recess 40.

The crankshaft is now turned again in a clockwise direction (Fig. 2) and then the control disk 49 will be prevented from turning likewise by the tooth 55, because arm 57 has been engaged by the notch 56 of stop plate 52. As soon as dog 39b bears against the shoulder 51, the stop plate 52 is brought back against the effect of arm 57 into its first position. The spacing of the notches 41, 42, and 43 of the gear wheels carried by the crankshaft amounts to about one-half the length of the arc of recess 50 so that in the above mentioned case, where after the change the succeeding dog a could not engage one of the recesses 41, 42, 43, such engaging becomes impossible during the clockwise rotation of the crankshaft.

If at the end of the back-pedaling, the control disk 49 advances in such a position with respect to dogs b, in which the dog facing the recess 50 is kept within its recess by the portion of the cut out receding into the bore, this dog will be brought into engagement with the shoulder 51, owing to the stopping of the control disk by the stop plate when the shaft is again pedaled in a clockwise direction. In this position a complete engagement of said dog a is always possible. Thus care has been taken that in no case a dog be engaged only partially or not at all.

If it is desired to jump one step, it suffices, as may be seen from the drawings, to back pedal the shaft for two-thirds revolution instead of only one-third revolution. Then the operations as described will take place with the difference that the dog b which corresponds to the jumped step will pass the recess 50 so that it projects into said depression for only a short time and will be immediately afterwards disengaged again and depressed into the recess of the crankshaft. Only the following dog b will be engaged with the shoulder 51 by a stopping of the shaft.

What I claim is:

In a structure of the character described, a rotatable shaft having a peripheral recess, a pawl pivotally connected to the shaft and movable into said recess, said pawl having a substantially semi-spherical cavity, a substantially conical coil spring having its largest end seated in the recess the spring being unsupported throughout its length, a substantially semi-spherical head secured to the outer end of the spring and slidably engaging the surface of the cavity, and a pin fixed to the head and extending into the smaller end portion of the spring.

WERNER LAUPER.